(No Model.)
A. J. KERN.
CULTIVATOR SHOVEL.
No. 429,037. Patented May 27, 1890.
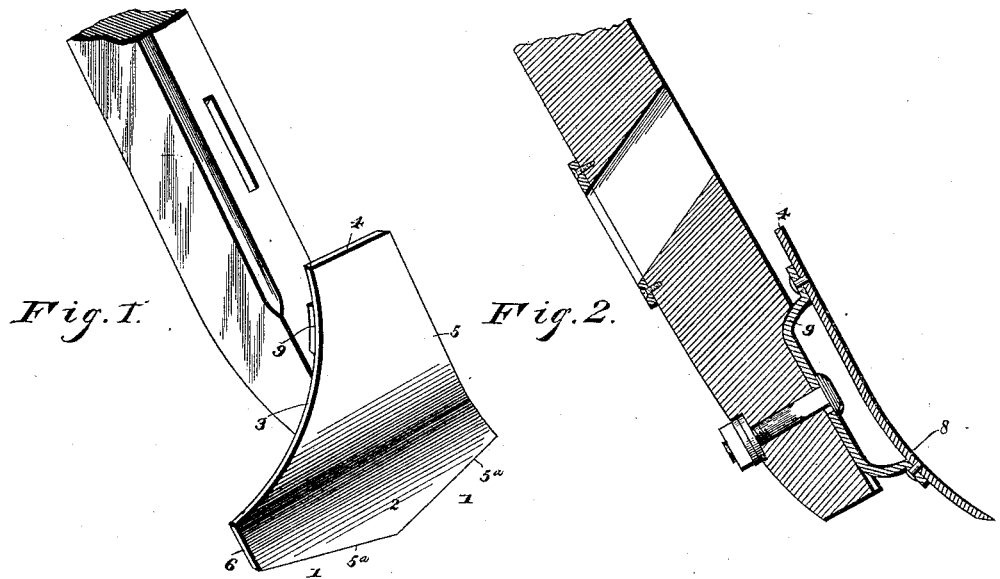
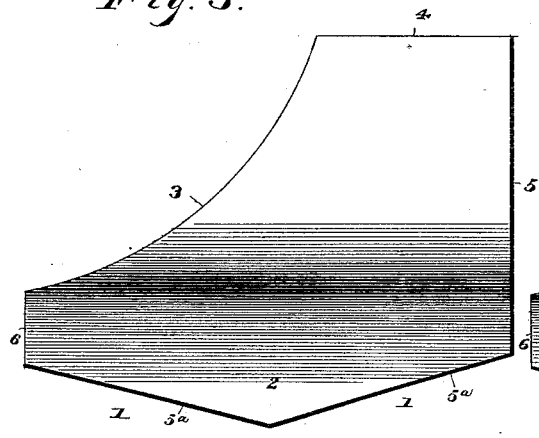
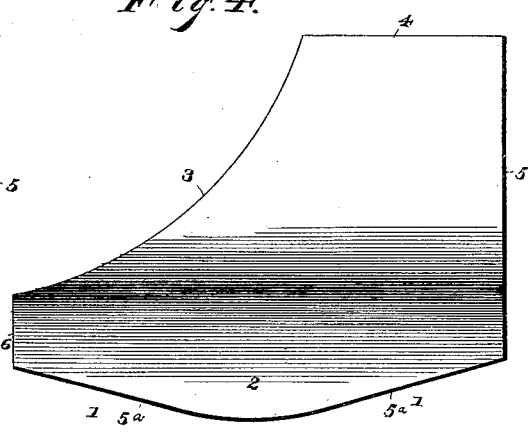
Witnesses,
Inventor
Amiah J. Kern,
By his Attorneys,
C. A. Snow & Co.

UNITED STATES PATENT OFFICE.

AMIAH J. KERN, OF BELLEVUE, OHIO.

CULTIVATOR-SHOVEL.

SPECIFICATION forming part of Letters Patent No. 429,037, dated May 27, 1890.

Application filed February 10, 1890. Serial No. 339,935. (No model.)

*To all whom it may concern:*

Be it known that I, AMIAH J. KERN, a citizen of the United States, residing at Bellevue, in the county of Huron and State of Ohio, have invented a new and useful Cultivator-Shovel, of which the following is a specification.

This invention relates to cultivator-shovels; and it has for its object to construct a device of this class which shall possess superior advantages in point of simplicity of construction and efficiency in operation.

The invention consists in the improved construction of the shovel, which will be hereinafter fully described, and particularly pointed out in the claims.

The cultivator-shovels as heretofore constructed have almost invariably and universally been subject to a serious disadvantage in this, that it has been impossible to cultivate very close to the growing plants without danger of either injuring the plants by cutting them with the cultivator blade or shovel or burying them under the heavy clods and lumps of dirt which have been thrown over in the direction of the row of plants by the action of the blade or shovel. These disadvantages, as I have found, arise from the peculiar conformation of the shovel-blades usually employed. Although a great variety of such blades of all manner of shapes may be found in the market, they all, so far as I am aware, are curved or concaved throughout their length in such a manner as to throw all of the soil loosened by the blade, or the greater portion of it, over against the plants. Again, the blades heretofore usually employed have been of such a nature as to render it unsafe to cultivate very close to the plants, for the reasons above set forth.

To overcome these objections is the purpose of my invention, which I shall now proceed more fully to describe with reference to the drawings, in which—

Figure 1 is a perspective view showing my improved cultivator-shovel attached to a standard in position for operation. Fig. 2 is a vertical sectional view of the same. Fig. 3 is a plan view. Fig. 4 is a similar view showing a slightly-modified construction.

Like numerals of reference indicate like parts in all the figures.

My improved cultivator shovel or blade may be described as consisting of a substantially rectangular plate of greater width than height, the lower edge of which has its corners cut off, as shown at 1 1, to form the central point 2. The upper inner corner of the blade, whereby is meant the upper corner on the side which in operation is nearest the row of plants, is likewise removed by a segmental cut, as shown at 3, which is about concentric with the extreme corner of the removed portion. A blade is thus formed having the straight upper and outer edges 4 and 5 at right angles to each other, the inclined lower edges $5^a$ $5^a$ tapering to the point 2, the straight inner edge 6 extending upwardly a short distance from the lower inner corner, and the curved edge 3 connecting the upper end of the inner edge 6 and the inner end of the upper edge 4. The upper portion of the blade, which comprises nearly all that portion of the blade lying above a line drawn from the upper end of the inner edge 6 parallel to the upper edge 4, is left straight or plane, while the lower portion of the blade is slightly curved or concaved, as will be best seen at 8 in Fig. 2 of the drawings.

Suitably secured upon the rear side of the blade is a socket 9, by means of which the blade may be secured adjustably to a standard of ordinary construction.

In operation the inner blunt edge 6 of the blade is nearest the row of growing plants, and it will be seen that said edge may be run quite close to the growing plants without danger of cutting or otherwise injuring them. At the same time the soil will be loosened very close to the roots of the plants and be finely pulverized by the action of the blade. As the soil is loosened and pushed upwardly over the blade, the finer portions thereof will drop over the curved edge 3 and directly onto the roots of the plants, which are thus sufficiently covered with the lighter earth, while the coarser particles are carried upwardly along the blade of the shovel and eventually it is discharged at a proper distance from the plants.

Cultivator-blades somewhat resembling mine have heretofore been made; but in such as have come to my knowledge the blade has been tapered to a point at its inner corner. Consequently, in order to do effective work it has been necessary to work very close to the plants, which have thereby been endangered. By my present improvement I am enabled to cultivate sufficiently close to do thoroughly effective work, and without danger to the plants.

The great comparative width of my improved cultivator-blade renders its work correspondingly effective, and at the same time it does not materially increase the draft, for the reason that the inner portion of the blade, or the portion nearest the row of plants, is quite low, and consequently presents but little frictional resistance. The straight or plane upper portion of the blade also tends to decrease the draft, and it imparts to the soil as it rises along the blade a peculiar whirling movement, which is very effective in separating the finer from the coarser particles and permitting the former to drop over the curved corner of the blade.

By the modification illustrated in Fig. 4 of the drawings the point of the blade is smoothly rounded instead of being brought to a sharp point. I reserve the right to this and to any other modifications which may be resorted to without departing from the spirit of my invention.

I claim and desire to secure by Letters Patent—

1. A cultivator-blade consisting of a mainly-rectangular blade of greater width than height, provided with a cutting-point at its lower edge and having its upper inner corner removed by a segmental cut about concentric with the removed corner, leaving a short blunt inner edge, substantially as set forth.

2. A cultivator-blade consisting of a mainly-rectangular blade of greater width than height, provided with a cutting-point at its lower edge and having its upper inner corner removed by a segmental cut about concentric with the corner of the removed portion, leaving a short straight or blunt inner edge, the lower portion of said blade being slightly curved or concaved and its upper portion flat or plane, as and for the purpose set forth.

In testimony that I claim the foregoing as my own I have hereto affixed my signature in presence of two witnesses.

AMIAH J. KERN.

Witnesses:
JOHN H. SIGGERS,
R. J. MARSHAL.